(12) United States Patent
Capel

(10) Patent No.: US 6,377,023 B1
(45) Date of Patent: Apr. 23, 2002

(54) CHARGING CONTROL SYSTEM FOR A BATTERY OF ELECTRIC STORAGE CELLS AND IN PARTICULAR A BATTERY OF LITHIUM CELLS

(75) Inventor: Antoine Capel, Goyrans (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/692,453

(22) Filed: Oct. 20, 2000

(30) Foreign Application Priority Data

Oct. 21, 1999 (FR) .............................. 99 13121

(51) Int. Cl.[7] .................................................. H02J 7/00
(52) U.S. Cl. ....................................................... 320/116
(58) Field of Search ................................ 320/116, 120, 320/125, 119

(56) References Cited

U.S. PATENT DOCUMENTS

| 5,412,305 A | * | 5/1995 | Jeanneret | 320/119 |
|---|---|---|---|---|
| 5,666,041 A | * | 9/1997 | Stuart et al. | 320/116 |
| 5,747,968 A | * | 5/1998 | Merritt et al. | 320/119 |
| 5,754,028 A | * | 5/1998 | Vezzini | 320/115 |
| 5,773,959 A | * | 6/1998 | Merritt et al. | 320/120 |
| 6,121,751 A | * | 3/2000 | Merritt | 320/116 |

FOREIGN PATENT DOCUMENTS

| EP | 0 573 832 A1 | 12/1993 |
|---|---|---|
| EP | 0 749 191 A1 | 12/1996 |
| WO | WO 93/15544 | 8/1993 |
| WO | WO 96/31933 | 10/1996 |

OTHER PUBLICATIONS

Kutkut, N. H. et al.: "Dynamic Equalization Techniques for ?Series Battery Stacks" Intelec, International Telecommunications Energy Conference, US, New York, IEEE, vol. CONF. 18, 1996, pp. 514–521, XP000699874.

* cited by examiner

Primary Examiner—Peter S. Wong
Assistant Examiner—Pia Tibbits
(74) Attorney, Agent, or Firm—Sughrue Mion, PLLC

(57) ABSTRACT

The charging control system for a battery of rechargeable electric storage cells, and in particular for a lithium battery, including cells connected in series which are adapted to be connected to a common electrical power supply. The system includes individual cell charging control units each of which is equipped with means adapted, in operation, to be connected to the power supply to take the energy necessary for charging a cell and which itself provides all of the operations for charging that cell using the energy thus taken.

4 Claims, 2 Drawing Sheets

CHARGING CONTROL SYSTEM FOR A BATTERY OF ELECTRIC STORAGE CELLS AND IN PARTICULAR A BATTERY OF LITHIUM CELLS

The invention relates to a charging control system for a battery of rechargeable electric storage cells and more particularly for a battery made up of lithium cells.

BACKGROUND OF THE INVENTION

The cells of rechargeable lithium batteries of the lithium-ion and lithium-metal type offer significantly better performance in terms of energy and mass than rechargeable nickel-cadmium or nickel-hydrogen cells. However, they are not totally satisfactory in applications where long life and high reliability are required, in particular with regard to controlling their charge in ampere-hours while they are in use.

A lithium cell is less able to withstand temporary or permanent overcharging than a nickel-cadmium or nickel-hydride cell, in which overcharging does not cause any perceptible deterioration. In the case of a lithium-carbon cell, overcharging forms a deposit of carbonate which cannot afterwards recombine with the active material of the cell. Active material is therefore consumed each time the cell is overcharged, which represents an irreversible loss of cell capacity. It is therefore beneficial to control batteries made up of lithium cells in an appropriate manner that takes this characteristic into account.

For practical and economic reasons, the charging of a battery is usually controlled by a central control unit which controls the charging current supplied to all of the cells constituting the battery and in particular how the charging current is reduced at the end of charging. Individual auxiliary control units allocated to the cells provide accurate control of the end of charging on a cell by cell basis.

OBJECTS AND SUMMARY OF THE INVENTION

The present invention therefore proposes a charging system for a battery of electric storage cells, and more particularly for a battery made up of lithium cells, the system being intended to optimize control of the cells, and in particular to prevent a reduction in their capacity over time.

The charging control system is therefore intended to be associated with a battery of rechargeable electric storage cells including a plurality of cells connected in series and each of which is associated with means adapted to be connected to a common electrical power supply and to take therefrom the energy necessary for charging the cell with which they are associated.

According to a feature of the invention, the system includes individual cell charging control units each including the means for taking the energy necessary for charging one of the cells from the common supply, to which said means are connected, and means enabling the unit itself to provide all of the charging operations for said cell using the energy supplied by its means for taking energy.

According to the invention, a power supply bus connects the connecting systems of each of the individual control units to the connecting system of the supply.

According to the invention, each cell charging control unit includes means for supplying the current necessary for charging the cell from the energy that the unit takes from the supply, which current depends on the voltage at the terminals of the cell and is kept below a value that corresponds to a predetermined fraction of the capacity of the cell.

The invention also proposes a battery of rechargeable electric storage cells comprising a plurality of cells connected in series and each of which is associated with means adapted to be connected to a common electrical power supply and to take the energy necessary for charging the associated cell.

According to a feature of the invention, the battery includes a charging control system including a set of individual cell charging control units each including means for taking the energy necessary for charging one of the cells from the common supply, to which said means are connected, and means enabling the unit itself to provide all of the charging operations for said cell from the energy provided by its means for taking energy.

According to the invention, the individual cell charging control units and the cells are combined into modules each including one cell and one charging control unit by which the cell is individually powered from a common bus connected to the supply and via supply connecting systems and module connecting systems.

BRIEF DESCRIPTION OF THE DRAWINGS

The invention, its features and its advantages are explained in the following description, which is given with reference to the figures listed below.

MORE DETAILED DESCRIPTION

Figure 1:
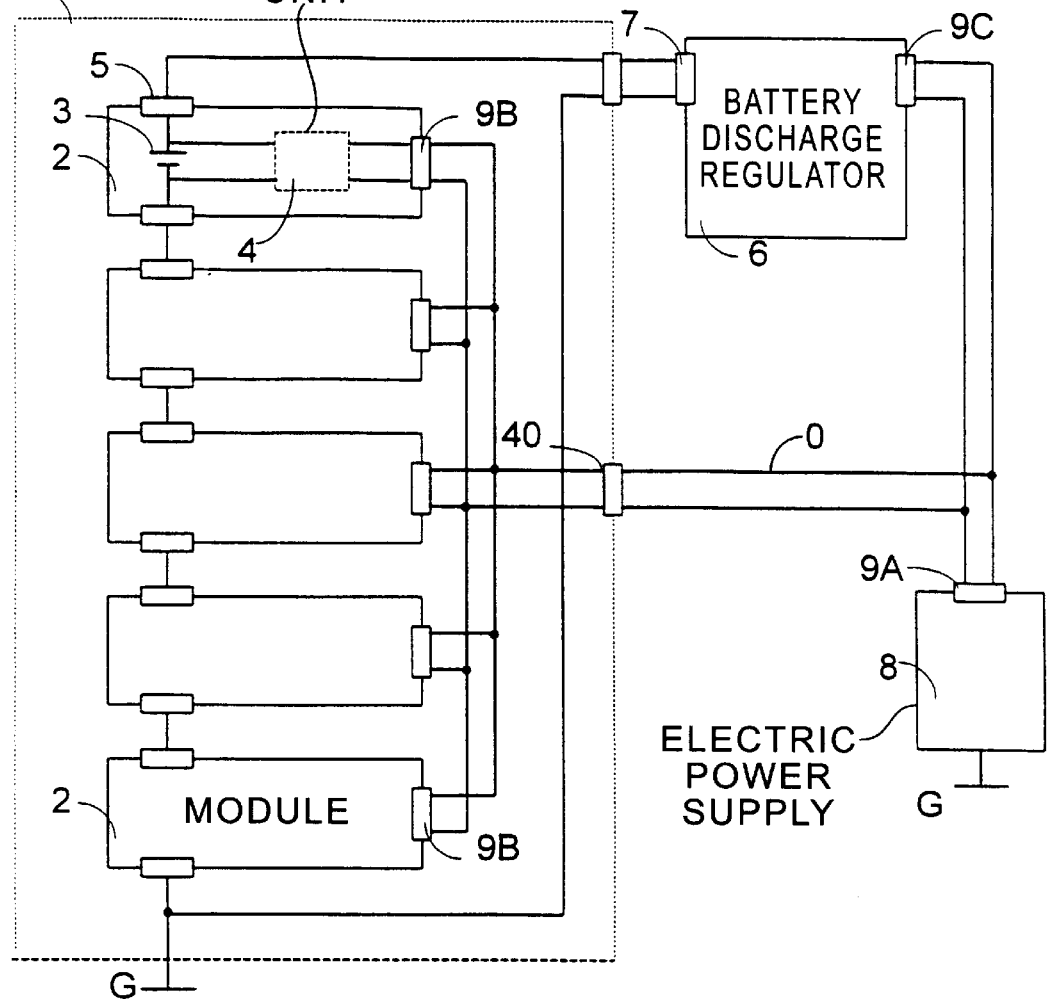
FIG. 1 is a block diagram of a charging control system in accordance with the invention for a battery of electric storage cells.

The charging control system for a battery of electrical cells shown in FIG. 1 is for use with a system 1 including a plurality of modules 2 each consisting of a cell, for example a lithium cell, and an individual charging control unit for that cell.

Figure 2:
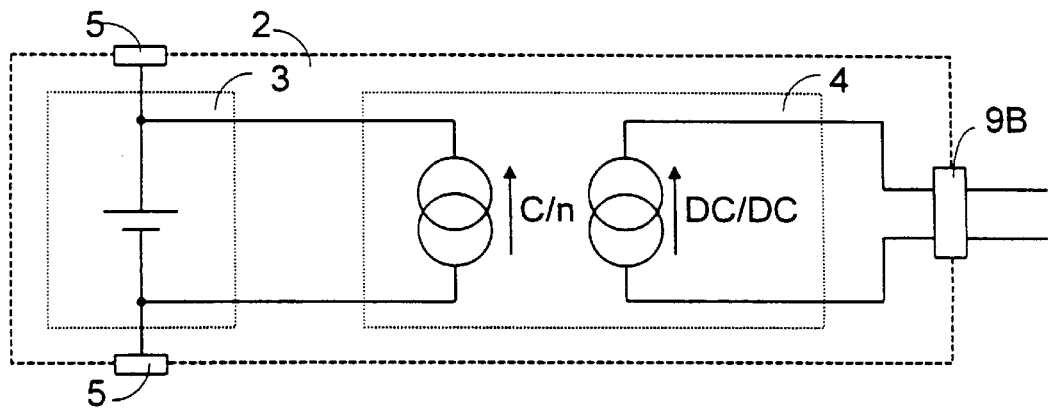
FIG. 2 is a block diagram of one module of a control system as shown in FIG. 1.

FIG. 2 shows one example of a module 2 including a cell 3 and an individual control unit 4.

The cells of the modules 2 are connected in series by connecting systems 5 each of which consists of a set of two complementary and separable connectors, for example. The two connecting systems 5 at the ends of the battery formed by the series-connected cells are respectively connected to a battery discharge regulator 6 via at least one connecting system 7. One of the connecting systems 5 at the ends of the battery is conventionally grounded by a connection G and a potential V is applied to the other one by the series-connected cells.

The regulator 6 feeds a load system, not shown. In this example the regulator is connected to an electrical power supply 8 which provides the current for charging the battery of cells 3 of the system 1 and which can also supply the load system, if required. The supply 8 is connected to each of the modules 2, or to be more precise to the individual charging control unit 4 of each of the modules, by respective connecting systems 9A and 9B of the supply and of each module. These arrangements are known in the art and are conventionally used to connect at least two different electrical conductors. A supply bus 0 connects the connecting system 9B of each individual control unit 4 to the connecting system 9A of the supply 8.

Each individual control unit 4 takes individually from the supply 8 the energy necessary for charging the cell with which it is associated. To this end, a current source circuit is included in each module 2 to supply the necessary charging current to the cell 3 of the module from the common supply 8.

The charging current supplied to a cell can vary and in this example the variation is limited to less than a maximum value corresponding to a fraction C/n of the capacity C of the cell, for example one third of that capacity C (where C is expressed in units of current multiplied by time in hours, so that to a first approximation n is the time in hours that it would take to charge an empty cell at this maximum current). The power necessary for charging a cell is supplied via a DC/DC converter which draws the power from a supply bus which connects the connecting system 9A of the supply to the connecting system 9B of each of the modules 2.

In the embodiment shown, the supply 8 is also connected to the battery discharge regulator 6 via their respective connecting systems 9A, 9C. The energy stored in the cells is made available to the load system via the regulator 6, which regulates the voltage to a value VO. It can if necessary be supplied direct to the load system if the latter system is designed to operate at a variable voltage and in particular at the voltage V at the terminals of the battery consisting of the cells 3.

Each cell 3 is charged as a function of the energy that the supply 8 can provide, either at constant current or at variable current, depending on the possibilities offered, the current remaining limited to the value C/n indicated above. The voltage between the terminals of the cell increases until it reaches a predetermined threshold VSP which depends on the construction of the cell, for example 4.0 volts per cell. That value is then maintained by control means which are described later and the current flowing in the cell decreases exponentially to zero with a time constant that is specific to the cell itself. It decreases rapidly when the cell is charged and varies as the cell ages due to changes in the internal structure of the cell. The cell is not totally charged to the voltage VSP, charging continuing naturally and progressively in application of the process conventionally referred to as "tapering".

If a discharging current flows to meet a demand for energy from the load system, the direction of the current is reversed in the cells 3, through which the current flows in series, and this is detected by the control means of each cell, which then interrupt charging.

Figure 3:
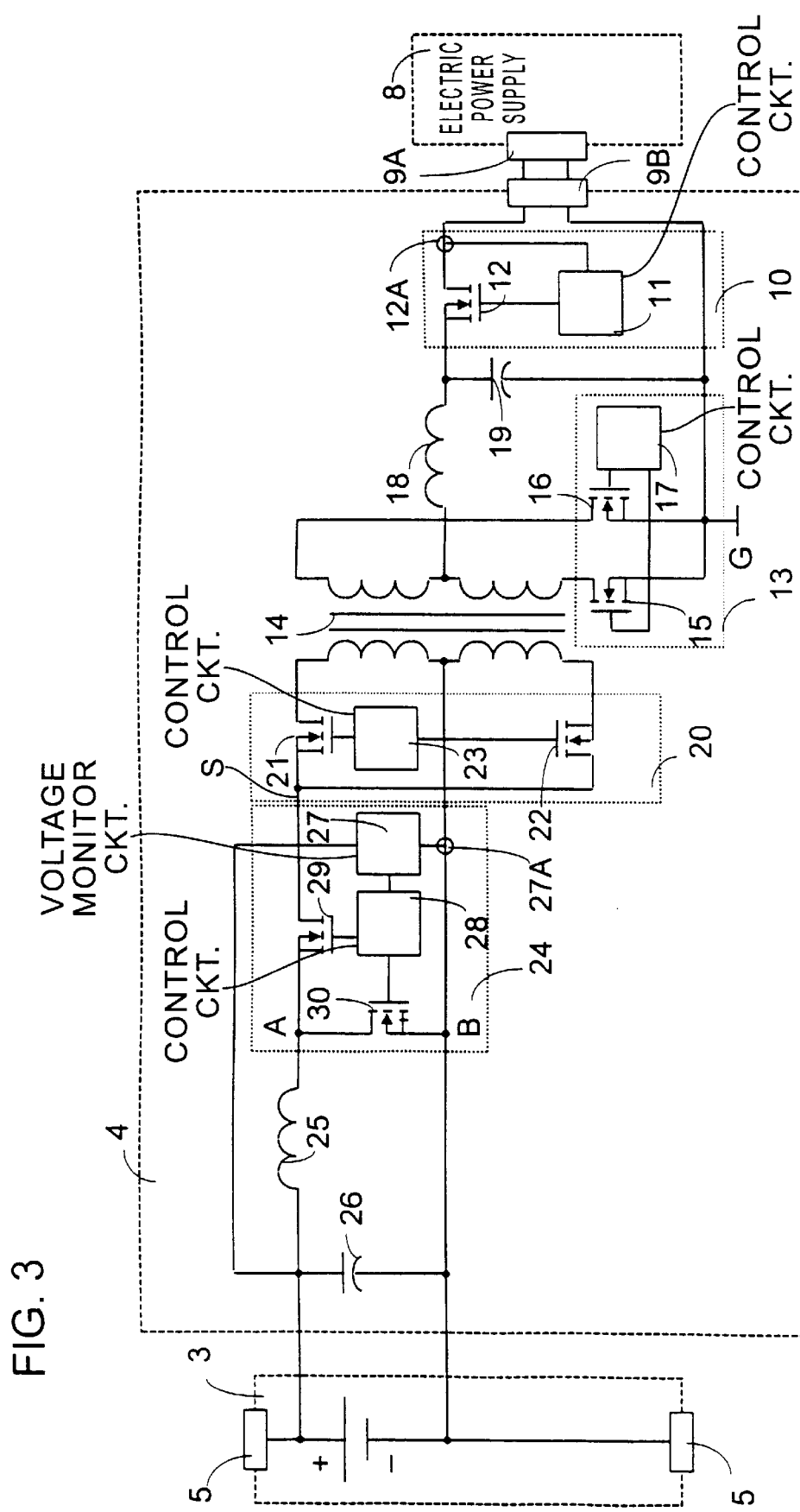
FIG. 3 is a detailed block diagram relating to one example of a module for a control system according to the invention.

FIG. 3 shows an example of a module for use in a control system in accordance with the invention. It includes a bidirectional current circuit, of the kind conventionally referred to as "buck" circuit, which includes a pulse generator circuit which produces pulses which are modulated in width, i.e. in duration, and a rectifier and filter stage. A series regulator 10 functioning as an electronic switch and current limiter and applying pre-regulation is energized by the supply 8 via the connecting system 9B to whose terminals it is connected. In this example the regulator 10 includes a control circuit 11 controlling a field-effect current switch 12 with a sensor 12A to feed a push-pull circuit 13 connected to the primary winding of a transformer 14. The circuit 13 includes two field-effect transistors 15 and 16 which are controlled in a manner known in the art by a control circuit 17. The source of each transistor is connected to ground G and its drain is connected to one end of the primary winding of the transformer 14. A center-tap of the primary winding of the transformer 14 is connected to the current switch 12 of the regulator 10 via an inductor 18 associated with a capacitor 19 to form an LC filter circuit.

The secondary winding of the transformer 14 is associated with a synchronous rectifier and filter stage including a push-pull circuit 20 including two field-effect transistors 21 and 22 controlled by a control circuit 23 and having their sources connected to the same output S and their drains connected to respective ends of the secondary winding of the transformer 14.

The circuit 20 feeds a regulator power supply circuit 24 which is connected to the terminals of the cell 3 via an LC circuit including an inductor 25 and a capacitor 26. The circuit 20 includes a voltage monitor circuit 27 and a current measuring sensor 27A which are connected to the terminals at the ends of the cell 3 and associated with a control circuit 28 controlling two field-effect transistors 29 and 30. The transistor 29 is connected in series between the output S of the circuit 20 and the inductor 25 connected to the positive terminal of the cell 3. The transistor 30 is connected between a point A common to the source of the transistor 29 and the inductor 25 and a point B connected to the negative terminal of the cell 3 and to the center-tap of the secondary winding of the transformer 14.

The regulator circuit 24 is adapted to deliver a current i (t) via the inductor 25 at a control voltage that corresponds to the voltage VSP referred to above. Because the cell 3 which receives this current is a voltage generator, it imposes its voltage on the regulator circuit, which supplies a maximum current to the cell until it has reached the control voltage.

The current supplied, which is measured by the sensor 27A, is limited to a maximum value corresponding to a fraction n of the value of the capacity C of the cell, as indicated above, if the voltage VSP has not been reached. From the time at which that voltage is reached, the current supplied to the cell is controlled so that it decreases exponentially, the cell continuing to be charged by the tapering process referred to above.

I claim:

1. A charging control system for a battery of rechargeable electric storage cells comprising:

a plurality of cells connected in series, each of the cells including:

a connector to connect a corresponding cell to a common electrical power supply; and a cell charging control unit which takes energy necessary for charging the corresponding cell from the common electrical power supply, and provides all of the charging operations for said corresponding cell, wherein the cell charging control unit includes a current supply circuit for supplying current necessary for charging the corresponding cell, the current measured by a sensor, and wherein during the charging operations, the voltage at terminals of the corresponding cell is kept below a value that corresponds to a predetermined fraction of a capacity of the cell, and further wherein the current supply circuit includes a regulator functioning as a current limiter and electronic switch which is associated with a push-pull circuit including field-effect transistors and connected to a primary winding of a transformer to take energy from the common electrical power supply, and a regulator power supply circuit connected to positive and negative terminals of the corresponding cell to which the regulator power supply circuit supplies a direct current obtained by rectification and filtering depending on the voltage present at said terminals and from a current obtained from a push-pull circuit connected to a secondary winding of the transformer.

2. A system according to claim 1, wherein a power supply bus connects the connector to a connecting system of the supply.

3. A battery of rechargeable electric storage cells comprising: a plurality of cells connected in series, each of the cells including:

- a connector to connect a corresponding cell to a common electrical power supply; and
- a cell charging control unit which takes energy necessary for charging the corresponding cell from the common electrical power supply, and provides all of the charging operations for said corresponding cell, wherein the cell charging control unit includes a current supply means for supplying current necessary for charging the corresponding cell, the current measured by a sensor, and wherein during the charging operations, the voltage at terminals of the corresponding cell is kept below a value that corresponds to a predetermined fraction of a capacity of the cell, and further wherein the current supply means includes:

- a regulator means, functioning as a current limiter and electronic switch which is associated with a push-pull circuit including field-effect transistors and connected to a primary winding of a transformer, for taking energy from the common electrical power supply; and
- a regulator power supply circuit connected to positive and negative terminals of the corresponding cell to which the regulator power supply circuit supplies a direct current obtained by rectification and filtering depending on the voltage present at said terminals and from a current obtained from a push-pull circuit connected to a secondary winding of the transformer.

4. A battery of electric storage cells according to claim 3, wherein the corresponding cell is individually powered from a common bus connected to the common electrical power supply and via supply connecting systems and module connecting systems.

* * * * *